United States Patent
Richter et al.

(10) Patent No.: US 7,354,022 B2
(45) Date of Patent: Apr. 8, 2008

(54) DEVICE FOR MONITORING TILTABLE FLAPS ON AIRCRAFT WINGS

(75) Inventors: Martin Richter, Bremen (DE); Dieter Lang, Stuhr (DE)

(73) Assignee: Airbus Deutschland GmbH (DE)

( * ) Notice: Subject to any disclaimer, the term of this patent is extended or adjusted under 35 U.S.C. 154(b) by 34 days.

(21) Appl. No.: 11/316,084

(22) Filed: Dec. 21, 2005

(65) Prior Publication Data

US 2006/0145028 A1   Jul. 6, 2006

(30) Foreign Application Priority Data

Dec. 22, 2004   (DE) ............... 10 2004 063 018

(51) Int. Cl.
   *G05D 1/00*   (2006.01)
(52) U.S. Cl. .................... 244/194; 244/213
(58) Field of Classification Search ............... 244/194, 244/195, 196, 197, 22, 99.2, 213, 99.3, 99.11
   See application file for complete search history.

(56) References Cited

U.S. PATENT DOCUMENTS

| | | | | |
|---|---|---|---|---|
| 5,628,477 A | * | 5/1997 | Caferro et al. ............. | 244/214 |
| 5,686,907 A | * | 11/1997 | Bedell et al. ............. | 340/945 |
| 6,299,108 B1 | * | 10/2001 | Lindstrom et al. .......... | 244/213 |
| 6,382,566 B1 | * | 5/2002 | Ferrel et al. ............. | 244/215 |
| 6,483,436 B1 | * | 11/2002 | Emaci et al. ............. | 340/686.1 |
| 6,930,489 B2 | * | 8/2005 | Schievelbusch et al. ..... | 324/503 |
| 7,048,234 B2 | | 5/2006 | Recksiek et al. ........... | 244/213 |

FOREIGN PATENT DOCUMENTS

| DE | 69816574 T2 | 6/2004 |
|---|---|---|
| DE | 10313728 A1 | 10/2004 |
| EP | 0 922 633 B1 | 7/2003 |

\* cited by examiner

*Primary Examiner*—Michael J. Carone
*Assistant Examiner*—Benjamin P Lee
(74) *Attorney, Agent, or Firm*—Ostrolenk, Faber, Gerb & Soffen, LLP

(57) ABSTRACT

A device for monitoring tiltable flaps on aircraft wings including rotary sensors at the rotary axis of the flap and associated with each actuating element. A rotation sensor is connected to the actuating elements by a spring band. The band is a coupled for angle transmission and the band is connected at a distance from the rotary axis. The spring band is stiff in the direction of rotation, while in the lateral direction, for the purpose of compensating for transverse movements of the actuating elements, the spring band is soft. For each flap, the signals of the rotary sensors, at decentralized monitoring devices to locate errors, are transmitted to an evaluation unit.

3 Claims, 4 Drawing Sheets

DEVICE FOR MONITORING TILTABLE FLAPS ON AIRCRAFT WINGS

This application claims the benefit of the filing date of German Patent Application No. 10 2004 063 018.6 filed Dec. 22, 2004, the disclosure of which is hereby incorporated herein by reference.

FIELD OF THE INVENTION

The invention relates to a device for monitoring adjustable flaps, such as landing flaps, on aircraft wings by way of rotary sensors connector to determine incorrect positions or faulty drives by connection to an evaluation unit, wherein the flaps are adjustable by central drive units as well as by a shafting, and each flap is held and adjustable by way of several associated local actuating elements.

TECHNOLOGICAL BACKGROUND

In known arrangements of landing flaps, operable by way of a central drive unit with a shafting, a plurality of landing flaps are activated. Local actuating elements having the form of spindles or crank mechanisms hold and tilt the individual flap. Normally, two synchronously operating local actuating devices are arranged.

There is a deficiency in that in the case of a fault of a local actuator, synchronization is no longer maintained, and the flap becomes twisted and jammed. If the fault is not detected in time and the flap continues to be activated, this results in the destruction of the flap structure.

To prevent such a state it is known to arrange a design comprising a double load path of the local actuating device. Furthermore, it is known that a torsion and a jamming is arranged by a position comparison between the flaps at the point of separation between two flaps. In particular, it is known to monitor torsion and jamming by a position comparison between the flaps at the point of separation between two flaps.

Furthermore, EP-B-922 633 provides for determining torsion and jamming by way of a comparison of the flap position of each drive station, wherein the flap positions are fed to a rotary sensor by way of rod assemblies/crank arrangements. However, it has been shown that such an arrangement with a rod assembly or a crank arrangement is disadvantageous because their tolerances have a negative influence on measuring accuracy. This results in the flap structures and mountings having to be designed to cope with unnecessarily large error forces. Furthermore, in the case of flaps with a fixed rotary axis, an unnecessarily large number of additional components are required.

SUMMARY OF THE INVENTION

It is the object of the invention, in a simple way, to provide torsion monitoring and tilt monitoring for flaps with error localization by decentralized monitoring, wherein the monitoring prevents inaccuracies and makes possible simple zero adjustment.

This need may be met by a device for monitoring adjustable flaps according to the invention.

According to an exemplary embodiment, in a device for monitoring adjustable flaps in each instance rotary sensors in the rotary axis of the flap are associated with each flap actuating element, and a sensor rotation by way of a spring band, as a coupler for angle transmission, is connected to the actuating element at a distance to/from the rotary axis, wherein the spring band is stiff in the direction of rotation, while in the lateral direction, for the purpose of compensating for transverse movements of the actuating elements, said spring band is soft, and for each flap the signals of the rotary sensors, as decentralized monitoring devices to locate errors, are transmittable to the evaluation unit.

In this way it may be possible to create an arrangement that may be optimal in weight, and to detect a fault in a local actuating element, as well as, by switching off the central drive, to prevent torsion or jamming of the flaps, and also to detect other incidents in the transmission, such as for example a broken shaft.

Furthermore, permanent torsion monitoring and jamming monitoring may no longer result in possible flap overloading by displacement, which may be experienced in practical application, of the so-called torque or force load limiter values at each station. The decentralized monitoring principle may provide a possibility of switching the central drive off when this fault occurs.

In a simple embodiment the spring band may be a spring steel band of flat extension in the direction of rotation.

In order to provide additional monitoring of the symmetry of the two wings, it may be provided that the signals of the rotary sensors, as monitoring devices for each flap, be fed to an evaluation device separately in relation to the flap symmetry of the left and the right wings.

According to another exemplary embodiment a device for monitoring adjustable flaps, such as landing flaps, on aircraft wings by way of rotary sensors to determine incorrect positions or faulty drives which communicate with an evaluation unit is provided, wherein the flaps are adjustable by central drive units as well as by shafting. Each flap is held and adjustable by way of several associated local actuating elements, wherein in each instance rotary sensors in the rotary axis of the flap are associated with each actuating element, and a sensor rotation via a spring band is connected to the actuating element, as a coupler for angle transmission, and the spring band is connected at a distance from the rotary axis, wherein the spring band is stiff in the direction of rotation, while in lateral direction, for the purpose of compensating for a transverse movements of the actuating elements, the spring band is soft, and in that for each flap the signals of the rotary sensors, as decentralized monitoring devices, are transmittable to the evaluation unit which is to locate errors in the local actuating elements.

According to still another exemplary embodiment of the device the spring band is a spring steel band having flat extension in the direction of rotation.

According to yet another exemplary embodiment of the device signals of the rotary sensors, as monitoring devices, of each flap can be fed to an evaluation device separately for the flap symmetry of the left and the right wings.

BRIEF DESCRIPTION OF THE DRAWINGS

The drawing diagrammatically shows an embodiment of the invention, as follows.

DESCRIPTION OF PREFERRED EMBODIMENTS OF THE INVENTION

Figure 1:
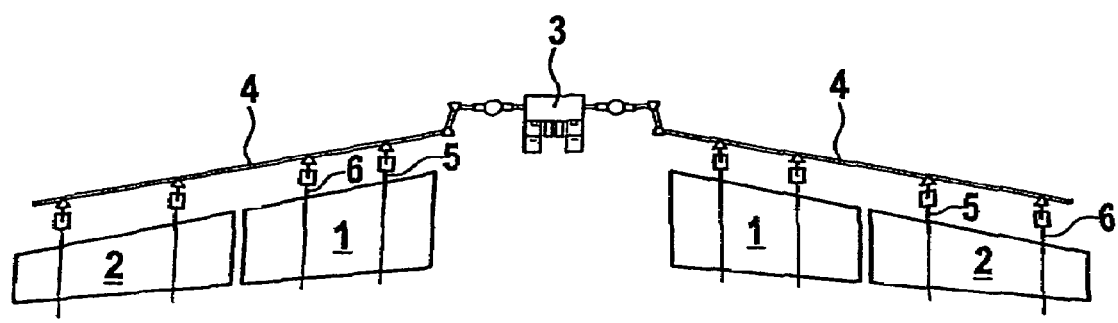
FIG. 1 a basic diagram of adjustable landing flaps by way of shafting of a central drive unit.
Figure 2:
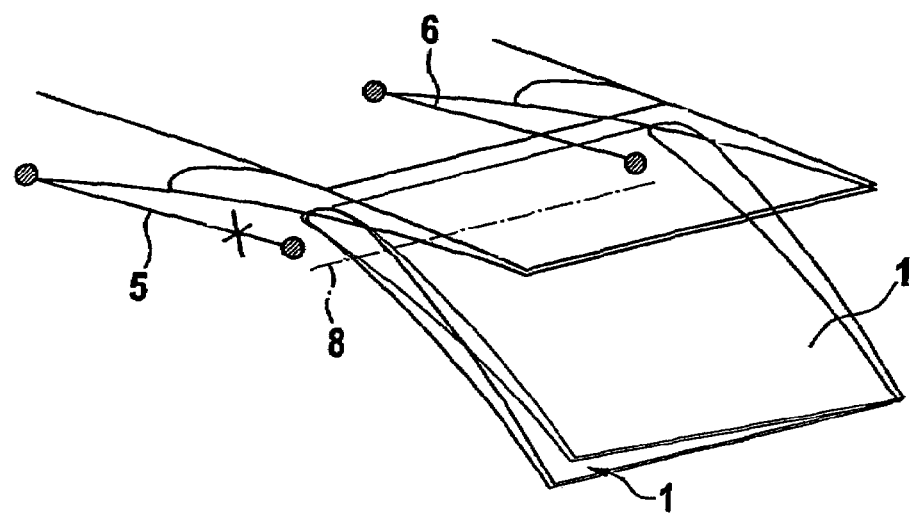
FIG. 2 a basic diagram with a flap in the extended and retracted states as well as in the case of failure of an actuating element.
Figure 3:
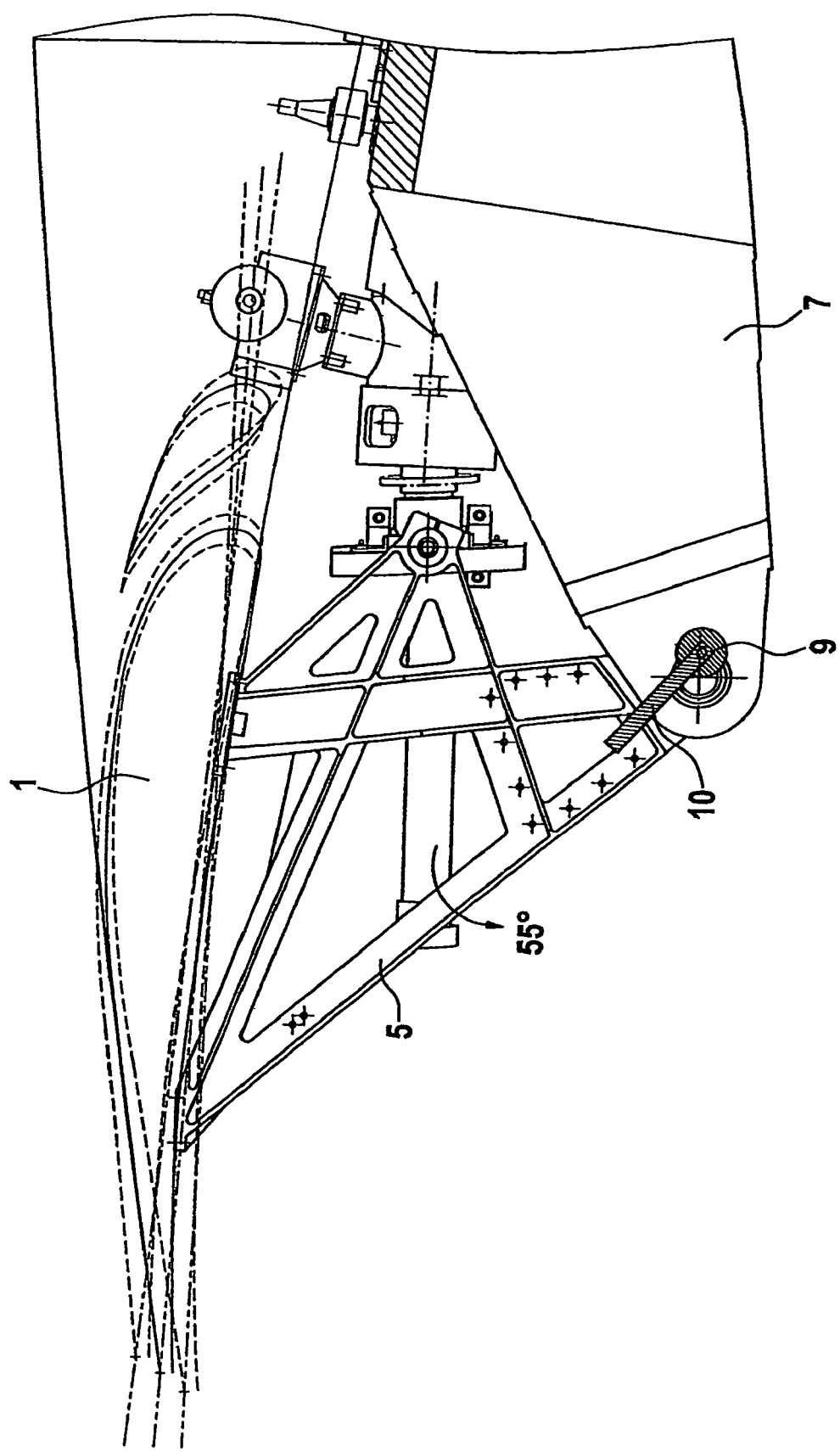
FIG. 3 a lateral view of a flap arrangement comprising an actuating element and an associated rotary sensor with a spring band for angle transmission.
Figure 4:
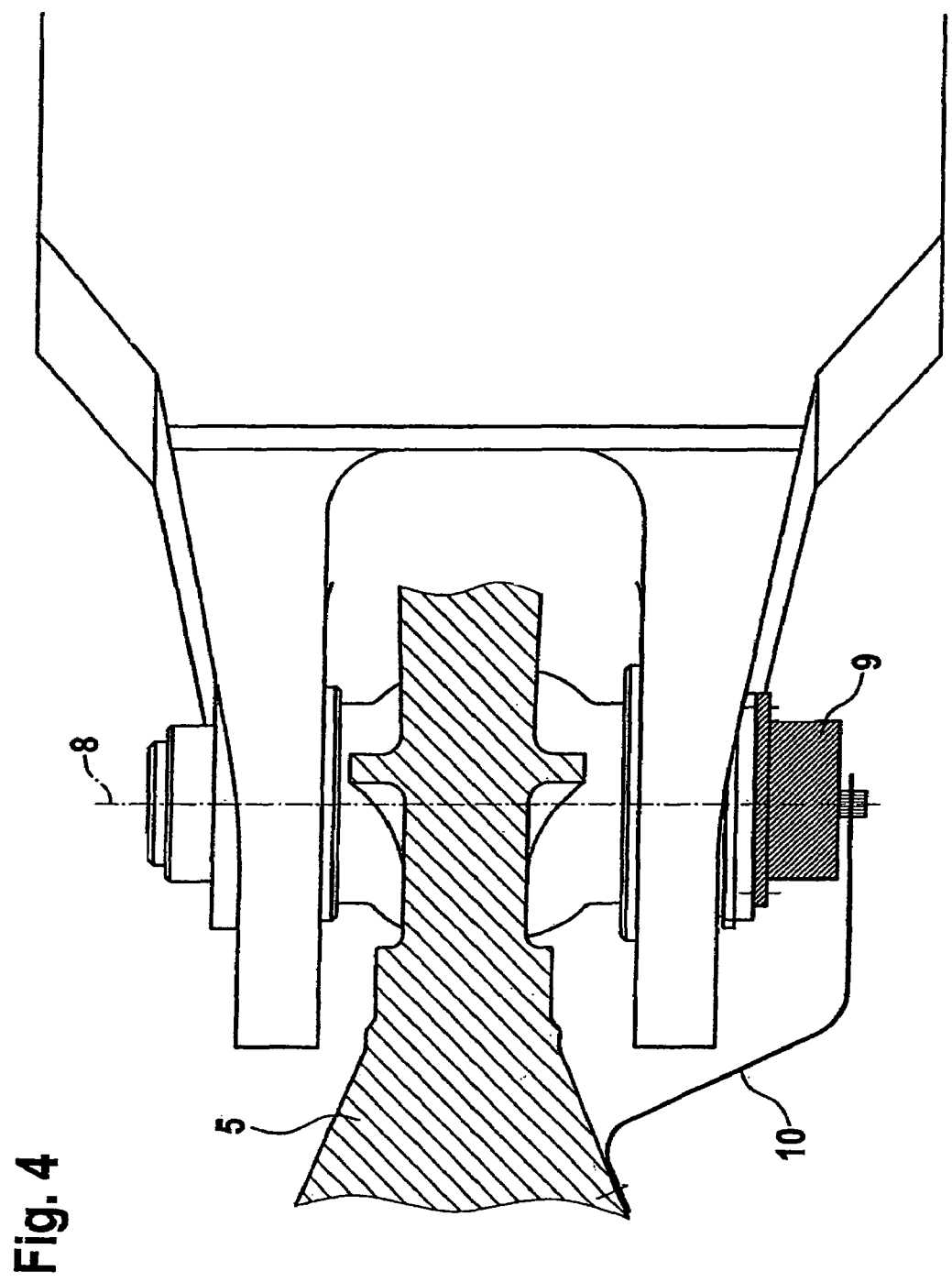
FIG. 4 a basic diagram of an extended flap position with an actuating element and an associated rotary sensor.
Figure 5:
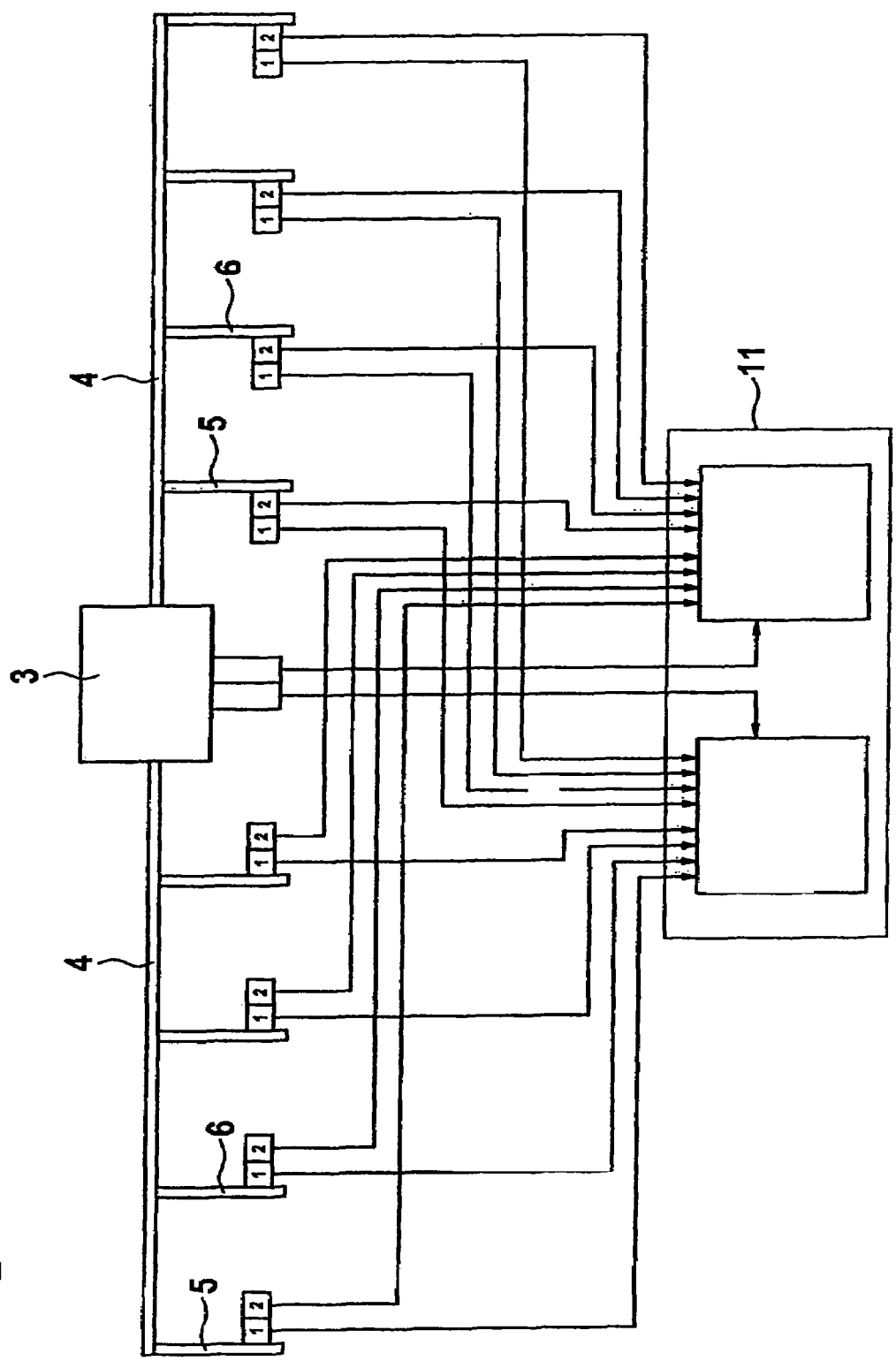
FIG. 5 a circuit arrangement of an arrangement.

In the arrangement shown, in each case two landing flaps 1 and 2 are arranged on each wing side and are adjustable by way of a central drive unit 3 and shafting 4. In this arrangement each flap 1, 2 is held by two actuating elements 5, 6 by which the flap is tiltably adjustable. Usually the flaps 1, 2 are held by the actuating elements 5, 6 and the guide 7.

Each flap 1, 2 comprises a fixed rotary axis 8 and is tilted by way of the associated actuating element 5, 6. In each case rotary sensors 9 are associated precisely with the pivot of the respective flap 1, 2. For accomplishing direct angle transmission of the flap tilt to the sensor rotation a spring band 10 is arranged between the rotary sensor 9 and the actuating element 5, 6. This spring band 10 is a spring steel band of flat expansion in the direction of rotation. In this way, good rigidity in the direction of rotation for good measuring accuracy is achieved while at the same time providing the necessary lateral softness to be pliant to permit movement transverse to the direction of flight. The lateral softness of the spring band 10 is necessary in order to compensate for the small transverse movements of the actuating elements by a deflection of the wing and flap.

The signals of the rotary sensors 9 for each flap 1, 2 with its associated actuating elements 5, 6 are fed to an associated evaluation device 11 which switches off the central drive unit 3 if necessary. At the same time, in this way, a flap symmetry between the left and the right wing is detectable and/or a fault can be found accordingly.

A malfunction of a local actuating element 5, 6 is thus detectable, as are other malfunctions of the transmission.

As a result of this decentralized monitoring, more precise error location also becomes possible.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

What is claimed is:

1. A device for monitoring adjustable flaps on aircraft wings, to determine incorrect positions or faulty drives, comprising shafting supporting the flaps and on which the flaps are pivotable for adjustment, at least one central drive unit operable for adjusting the flaps, by the shafting between the drive units and the flaps, and each flap is adjustable by several associated local actuating elements, the device comprising:

a plurality of rotary sensors connected with and operable for detecting the pivot of the flaps;

a plurality of local actuating elements, a respective one of the flaps is associated with a respective one of the plurality of local actuating elements, wherein each single flap is adjustable by several of the plurality of local actuating elements;

at least one spring band having a first end and a second end, wherein the first end of the at least one spring band is coupled to a rotary axis of one of the rotary sensors and the second end of the at least one spring band is coupled to the one of the local actuating elements at a position a distance from the respective rotary axis;

the at least one spring band is adapted to transmit a respective angle of the actuating element and the spring band relative to the rotary sensor;

the at least one spring band is stiff in the direction of rotation and is pliant enough in a lateral direction, so that the spring band compensates for transverse movements of the respective local actuating element connected to the spring band; and an evaluation unit; the plurality of rotary sensors form decentralized monitoring devices for locating faults in the local actuating elements of each flap and the sensors are further operable to transmit signals to the evaluation unit.

2. The device of claim 1, wherein the spring band is a spring steel band having flat extension in the direction of rotation.

3. The device of claim 1, wherein the rotary sensors are monitoring devices, operable so that each flap signal is fed to the evaluation device separately for flap symmetry of left and the right wings.

* * * * *